(12) United States Patent
Leverich

(10) Patent No.: US 11,130,934 B2
(45) Date of Patent: Sep. 28, 2021

(54) POURING SPOUT FOR BOTTLED LIQUIDS

(71) Applicant: Andrew Leverich, Holt, MI (US)

(72) Inventor: Andrew Leverich, Holt, MI (US)

(*) Notice: Subject to any disclaimer, the term of this patent is extended or adjusted under 35 U.S.C. 154(b) by 13 days.

(21) Appl. No.: 16/585,065

(22) Filed: Sep. 27, 2019

(65) Prior Publication Data
US 2020/0040290 A1    Feb. 6, 2020

Related U.S. Application Data

(63) Continuation-in-part of application No. 15/935,157, filed on Mar. 25, 2018, now abandoned.

(51) Int. Cl.
| | |
|---|---|
| *C12H 1/07* | (2006.01) |
| *B01D 39/06* | (2006.01) |
| *B01D 24/10* | (2006.01) |
| *B65D 25/42* | (2006.01) |

(52) U.S. Cl.
CPC ............ *C12H 1/063* (2013.01); *B01D 24/10* (2013.01); *B01D 39/06* (2013.01); *B65D 25/42* (2013.01)

(58) Field of Classification Search
CPC ....... C02F 1/283; C02F 2307/02; C02F 1/003
USPC ................................. 210/436, 472
See application file for complete search history.

(56) References Cited

U.S. PATENT DOCUMENTS

| | | | | |
|---|---|---|---|---|
| 1,428,297 | A * | 9/1922 | Price ........... | B65D 47/06 |
| | | | | 222/478 |
| 3,385,446 | A * | 5/1968 | Ward ........... | C12L 11/00 |
| | | | | 210/266 |
| 2014/0144329 | A1* | 5/2014 | Chiu ........... | C12H 1/063 |
| | | | | 99/277.1 |

* cited by examiner

*Primary Examiner* — Matthew O Savage

(57) ABSTRACT

Pouring spouts used to filter bottled liquids as they are poured from a bottle containing such liquids.

1 Claim, 6 Drawing Sheets

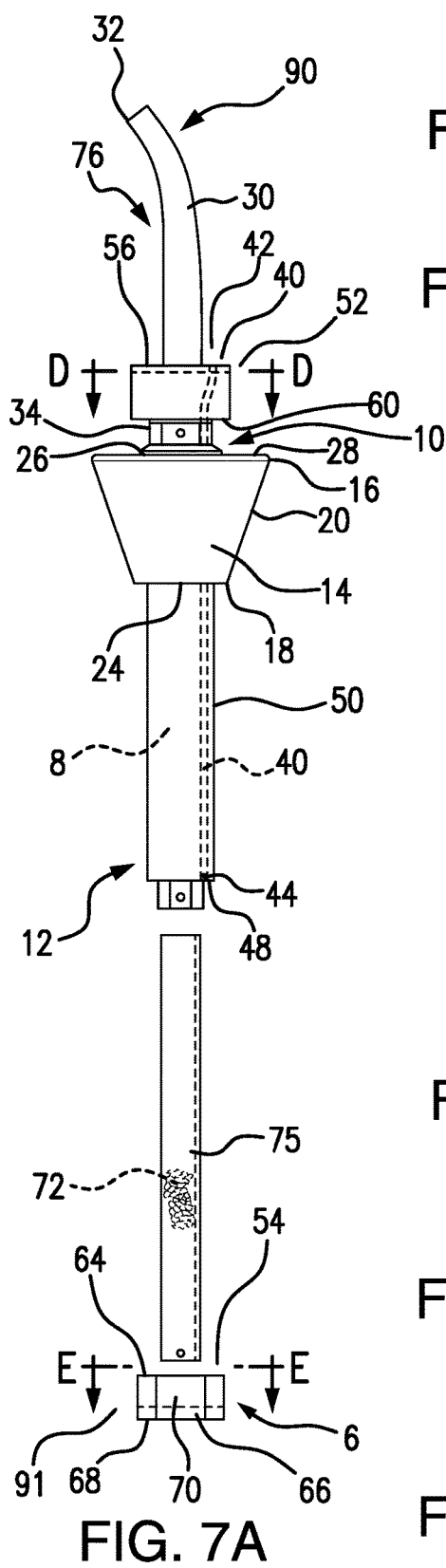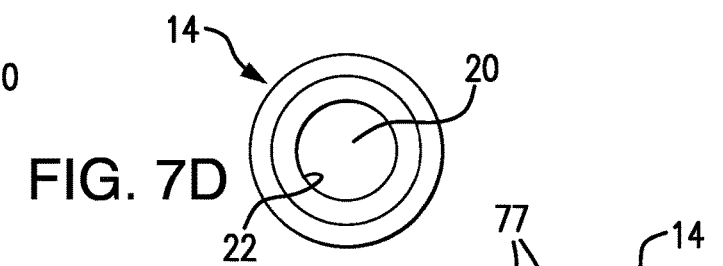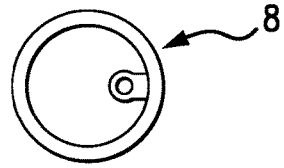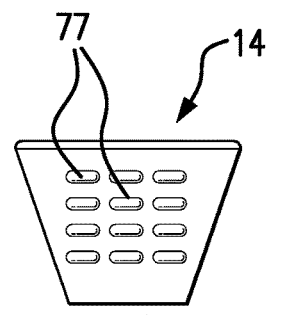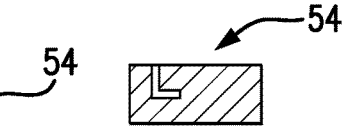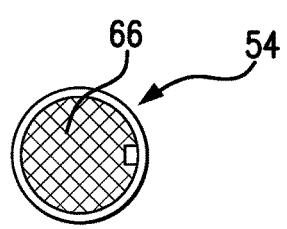

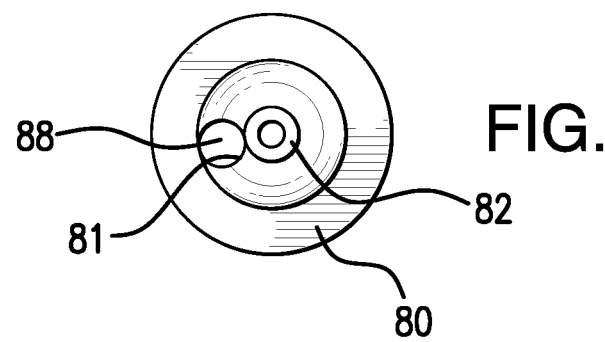
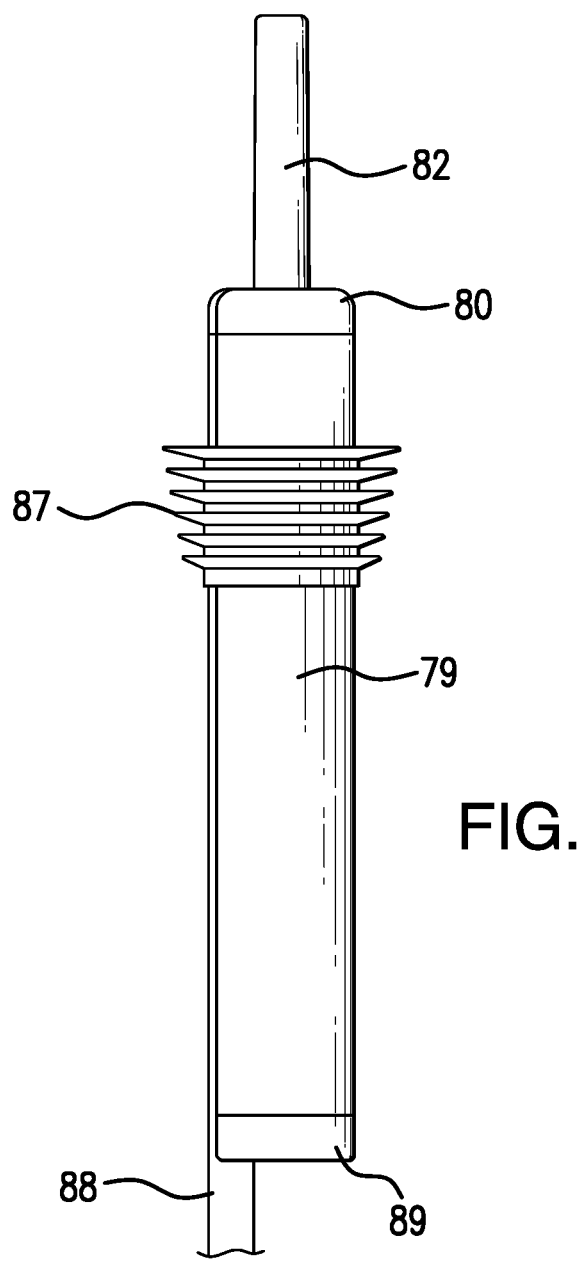

POURING SPOUT FOR BOTTLED LIQUIDS

BACKGROUND OF THE INVENTION

This application is a Continuation-in-Part application of Utility patent application Ser. No. 15/935,157, filed Mar. 26, 2018, from which priority is claimed. The applicant is unaware of any prior art.

THE INVENTION

The present invention is a filtration pouring spout for bottled liquids. The pouring spout comprises an elongated hollow housing. This elongated hollow housing has a top end and a bottom end. The ends are open.

The elongated hollow housing has an open removable cap on each end and each removable cap has contained in it a mesh screen. There are retainer lips mounted on the interior surface of each removable cap to support the mesh screens in the cap.

There is a flexible plug surmounting the top end of the elongated hollow housing. There is a spout surmounted on a top end of the flexible plug, and the flexible plug has a top opening and a bottom opening. The pouring spout has a top end and a base and the top end of the spout is bent a predetermined distance from the vertical. The base has a vacuum release opening through it. There is a vacuum release tube, the vacuum release tube is mounted in the vacuum release opening such that a predetermined length of the vacuum release tube extends above the base and is bent a predetermined distance from vertical, and 180° from the bend in the spout.

The vacuum release tube extends a predetermined distance on an outside surface of the elongated hollow housing.

There is a carbon filled cartridge fitted to the inside of the elongated hollow housing and it extends a predetermined distance inside of the elongated hollow housing.

In a second embodiment, there is shown in FIG. 7A a device of this invention in which the vacuum release opening is located interior to the housing.

In this embodiment, there is shown a filtration pouring spout for bottled liquids. The pouring spout comprises an elongated hollow housing. This elongated hollow housing has a top end and a bottom end. The ends are open.

The elongated hollow housing has an open removable cap on each end and each removable cap has contained in it a mesh screen. There are retainer lips mounted on the interior surface of each removable cap to support the mesh screens.

There is a flexible plug surrounding the top end of the elongated hollow housing. There is a spout surmounted on a top end of the top cap, and the flexible plug has a top opening and a bottom opening. The spout has a top end and a base and the top end of the spout is bent a predetermined distance from the vertical.

The base has a vacuum release opening through it. The vacuum release tube extends a predetermined distance on an inside surface of the elongated hollow housing.

There is a filter media filled cartridge fitted to the inside of the elongated hollow housing and it extends a predetermined distance inside of the elongated hollow housing.

In yet another embodiment, there is a filtration pouring spout for bottled liquids. The pouring spout comprised an elongated hollow housing. The elongated hollow housing has a top end and a bottom end, with each end being open.

The elongated hollow housing has an open removable cap on each end thereof, there being retainer lips mounted on the interior surface of each removable cap.

There is a pouring spout surmounted on the top cap and, a first concave channel on an outside surface of the elongated hollow housing, along an entire long axis of the elongated hollow housing.

There is a vacuum release tube, the vacuum release tube is mounted in the first concave channel and the vacuum release tube extends a predetermined distance from the bottom end of the elongated hollow housing.

There is a filter media filled cartridge fitted to the inside of the elongated hollow housing and extending a predetermined distance inside of the elongated hollow housing. The cartridge has a second concave channel that is aligned with the first concave channel, and, each end of the cartridge is fitted with a mesh screen to contain filter media within the filter cartridge. There also present a gasket-plug surrounding the elongated housing.

BRIEF DESCRIPTION OF THE DRAWING

FIG. 7A is a full side view of another embodiment of this invention.

FIG. 7B is a bottom view of the top spout of the inventive device of this invention.

FIG. 7C is a full top view of the top screen of this invention.

FIG. 7D is a full top view of the plug of this invention.

FIG. 7E is a full top view of the housing of this invention

FIG. 7F is a full top view of the filter cartridge of this invention.

FIG. 7G is a full bottom view of the lower cap of this invention.

FIG. 7H is a full top view of a screen on this invention.

FIG. 7I is a cross-sectional view through line A-A of FIG. 7A.

FIG. 7J is a cross-sectional view through line B-B of FIG. 7A.

FIG. 8 is a full side view of the plug of this invention having a plurality of rubber lips on the outside surface.

FIG. 9D is a full to view of the top cap of FIG. 9C.

FIG. 9G is a full view of the device of 9A with a gasket-plug in place.

DETAILED DESCRIPTION OF THE DRAWINGS

Figures 1, 2, 3:
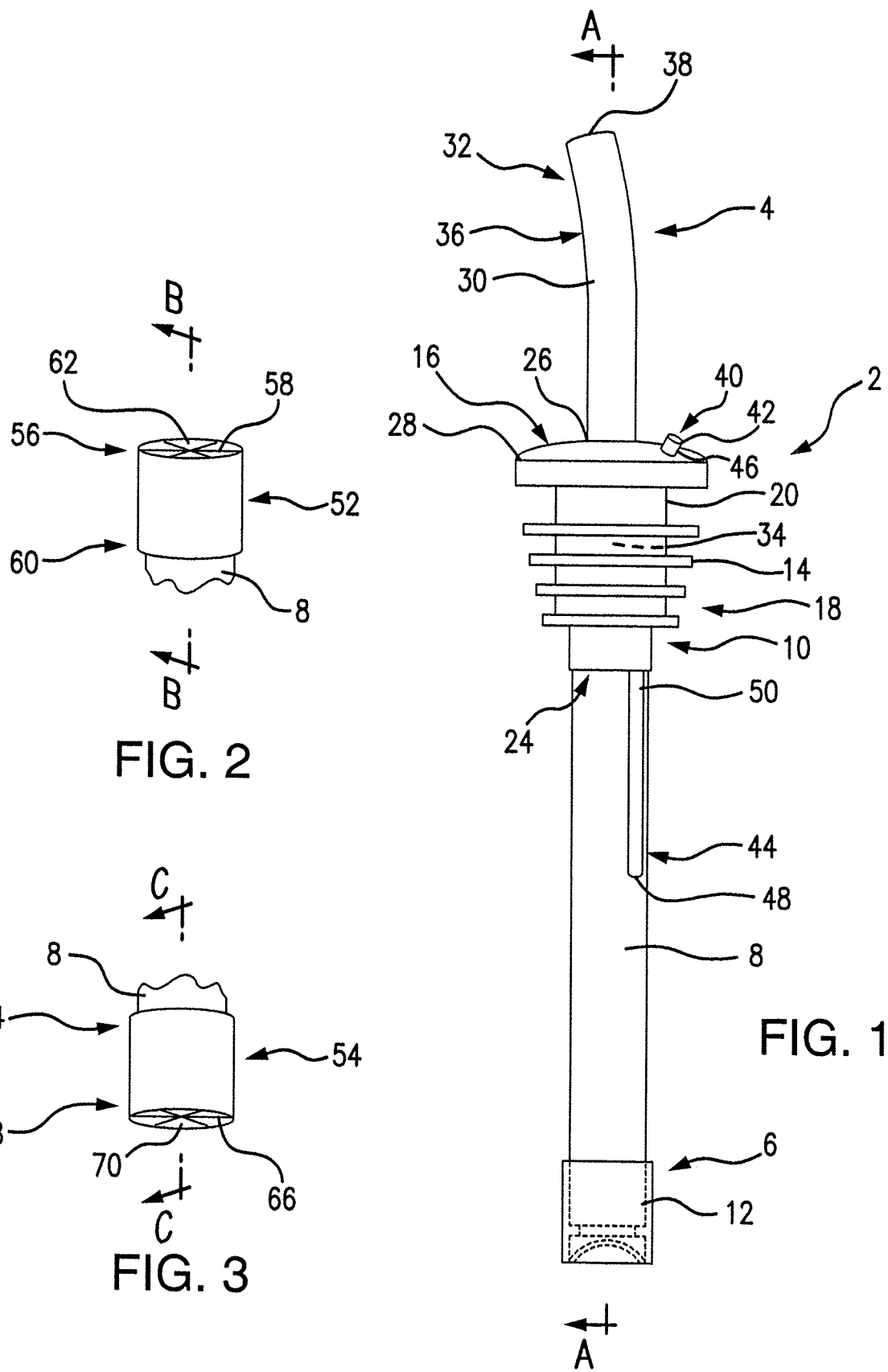
FIG. 1 is a full side view of the spout.
FIG. 2 is a view in perspective of the top cap of the elongated housing.
FIG. 3 is a view in perspective of the bottom cap of the elongated housing.

FIG. 1 is a full side view of the pouring spout 2 with line A-A bisecting the pouring spout 2. The pouring spout 2 has a top end 4 and a bottom end 6. The pouring spout 2 has an elongated portion 8. This elongated portion 8 has a top end 10 and a bottom end 12. The flexible plug 14 has a top end 16 and a bottom end 18. The top of the elongated housing 8 is inserted into the bottom of the flexible plug 14. The flexible plug 14 has an outside surface 20 and an inside surface 22 (shown in FIG. 4). The flexible plug 14 also has a top opening 26 and a bottom opening 24. The flexible plug 14 also has a top surface 28.

The flexible plug 14 also has a spout 30 inserted into it at the top opening 26 and extends through the top surface 28. The spout 30 has a top end 32 and a bottom end 34. The spout 30 has a predetermined angle 36 and an opening therethrough 38.

The flexible plug 14 also has a vacuum release tube 40. The vacuum release tube 40 has a top end 42 and a bottom end 44. The vacuum release tube 40 also has a predetermined angle 46. The angle 46 of the vacuum release tube 40 is diametrically opposed to the angle 36 of the spout 30. The vacuum release tube 40 also has an opening 48 through it and a middle portion 50.

It has been discovered that the flexible plug 14 has been designed to fit snuggly into a bottle of liquid, such as a bottle of alcohol. With the pouring spout 2 inserted into the bottle of alcohol the bottle is tipped to dispense some of the contents. During the pouring procedure the alcohol flows through the charcoal 72 that is in the elongated housing 8, filtering it. The charcoal 72 is a distiller's grade charcoal.

FIG. 2 shows the top cap 52 of the elongated housing 8 with line B-B bisecting the top cap 52 of the elongated housing 8. The top cap 52 has a top end 56 and a bottom end 60. Just below the top end 56 of the top cap 52 is a mesh 58. The mesh has an average opening of about 0.0203 mm. and the mesh can be anywhere from about 0.0100 mm to about 0.0300 mm. The top cap 52 has an opening 62 through it.

FIG. 3 shows the bottom cap 54 of the elongated housing 8 with line C-C bisecting the bottom cap 54 of the elongated housing 8. The bottom cap 54 has a top end 64 and a bottom end 68. Just below the bottom end 68 of the bottom cap 54 is a mesh screen 66. The bottom cap 54 has an opening 70 through it.

Figure 4:
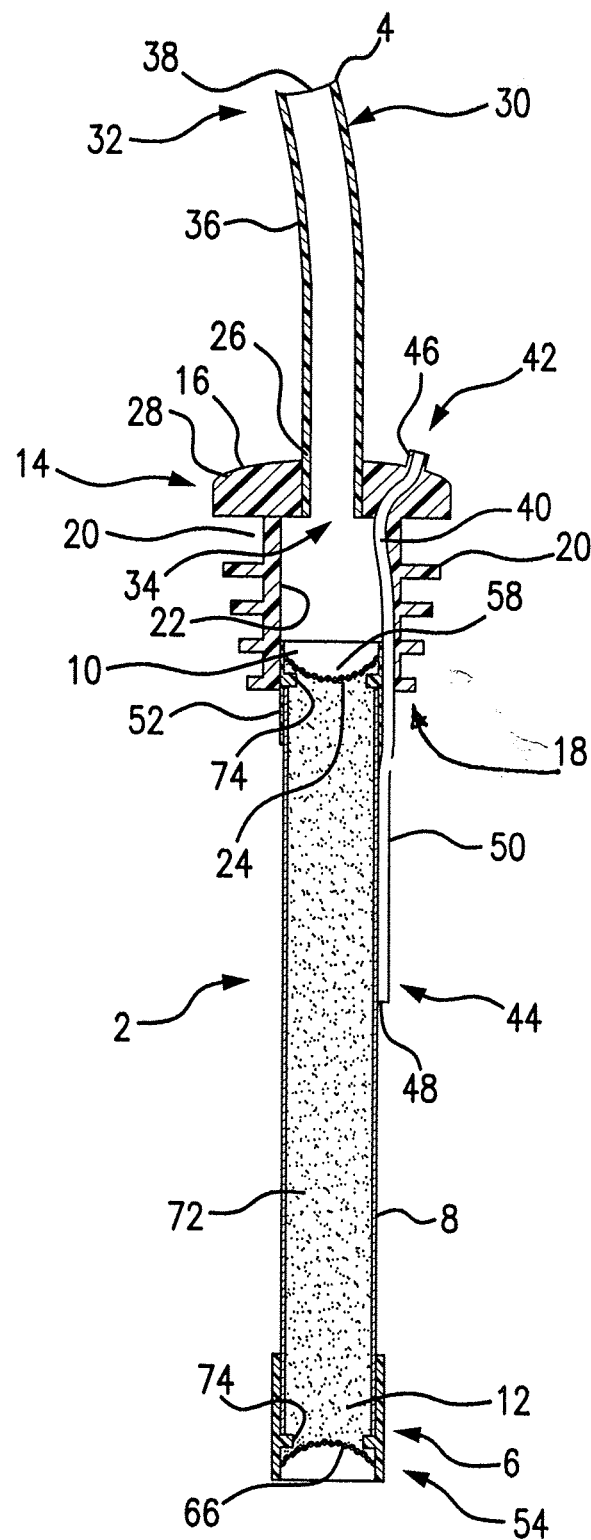
FIG. 4 is a cross sectional view through line A-A of FIG. 1.

FIG. 4 shows the pouring spout 2 bisected by line A-A of FIG. 1. This Figure shows the inside of the pouring spout 2 along line A-A bisecting the pouring spout 2. The pouring spout 2 has a top end 4 and a bottom end 6. The pouring spout 2 has an elongated portion 8. This elongated housing portion 8 has a top end 10 and a bottom end 12. The elongated housing 8 is inserted into the flexible plug 14. The flexible plug 14 has top end 16 and a bottom end 18. This flexible plug 14 has an outside surface 20 and an inside surface 22 (shown in FIG. 4). The flexible plug 14 also has a top opening 26 and a bottom opening 24. The flexible plug 14 also has a top surface 28.

The flexible plug 14 also has a spout 30 inserted into it at the top opening 26 and extends through the top surface 28. The spout 30 has a top end 32 and a bottom end 34. The spout 30 has a predetermined angle 36 and an opening 38 therethrough. The vacuum release tube 40 has a top end 42 and a bottom end 44.

As shown, the top end 42 of the vacuum release tube 40 exits the flexible plug 14. The vacuum release tube 40 also has a predetermined angle 46. The angle 46 of the exiting end 42 of the vacuum release tube 40 is diametrically opposed to the angle 36 of the spout 30. The vacuum release tube 40 also has an opening therethrough 48 and a middle portion 50.

The top end cap 52 has a mesh 58 and the bottom end cap 54 also has a mesh 66 that are held in place by lips 74. The elongated housing 8 is filled with charcoal 72 that acts as a filter. It has been discovered that the charcoal filters unwanted tastes from the alcohol that is being poured through the spout 2.

The vacuum release tube 40 shown here is an air vent 40 which allows air to flow into the alcohol bottle as alcohol is poured out. The spout 30 is angled in one direction while the vacuum release tube 40 angles in the opposite direction preventing the flow of the alcohol through the vacuum release system.

Figure 5:
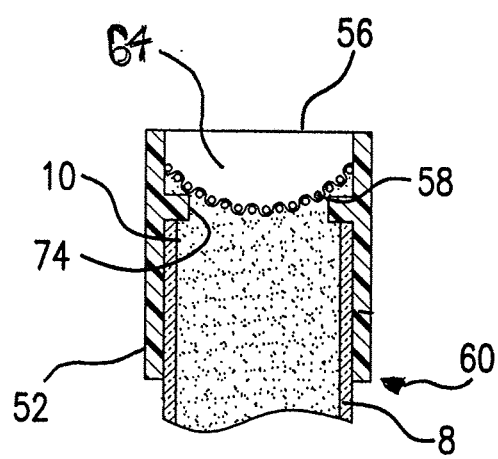
FIG. 5 is a cross sectional view through line B-B of FIG. 2.

FIG. 5 shows top end cap 52 bisected by line B-B. The top end cap 52 has top 56, the mesh 58, the bottom 60 and the lips 74 that hold the mesh 58 in place. Also shown is the top end 10 of the elongated housing 8.

Figure 6:
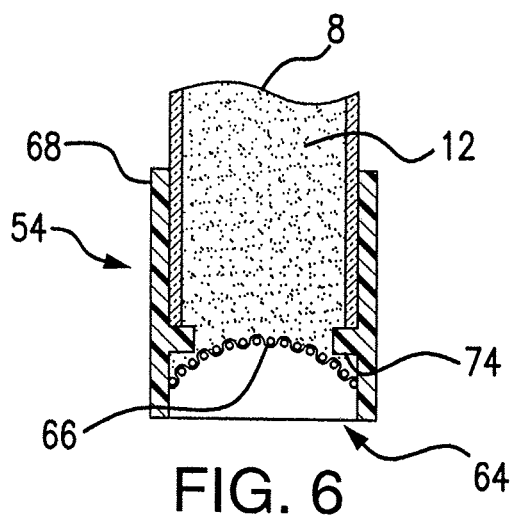
FIG. 6 is a cross sectional view through line C-C of FIG. 3.

FIG. 6 shows the pouring spout 2 bottom end cap 54 bisected by line C-C. The bottom end cap 54 has a top 68, a mesh 66, a bottom 64 and the lips 74 that hold the mesh 66 in place. Also shown is the bottom end 12 of the elongated housing 8.

The mesh 58 and 66 is fine enough to prevent any of the charcoal 72 from leaving the elongated housing 8.

In the second embodiment, there is a filtered pouring spout in which the vacuum release tube 40 is located in the interior of the elongated housing 8.

Thus, shown in FIG. 7A is the second embodiment showing a pouring spout 76 of this invention with line D-D bisecting the top end cap 52. The pouring spout 76 also has a bottom end 6. The pouring spout 76 has an elongated housing portion 8, and top end 10 and a bottom end 12.

The flexible plug 14 has a top end 16 and a bottom end 18. The elongated housing 8 is inserted into the bottom of the flexible plug 14. The flexible plug 14 has an outside surface 20 and an inside surface 22 (shown in FIG. 7D). The flexible plug 14 also has a top opening 26 and a bottom opening 24 (FIG. 8). The flexible plug 14 also has a top surface 28.

There is a vacuum release tube 40 that is affixed to the interior surface of the elongated housing. The vacuum release tube 40 has a top end 42 and a bottom end 44. The vacuum release tube 40 also has a predetermined angle. The angle of the vacuum release tube 40 is diametrically opposed to the angle of the spout 30. The vacuum release tube 40 also has an opening 48 through it and a middle portion 50.

It has been discovered that the flexible plug 14 has been designed to fit snuggly into a bottle of liquid, such as a bottle of alcohol. With the pouring spout 76 inserted into the bottle of alcohol the bottle is tipped to dispense some of the contents. During the pouring procedure the alcohol flows through the charcoal 72 that is in a cartridge 75 of the elongated housing 8, filtering it. The charcoal 72 is a distiller's grade charcoal.

FIG. 7A shows the top cap 52 of the elongated housing 8 with line D-D bisecting the top cap 52 of the elongated housing 8. The top cap 52 has a top end 56 and a bottom end 60. Just below the top end 56 of the top cap 52 is a mesh 58. The mesh has an average opening of about 0.0203 mm. and the mesh can be anywhere from about 0.0100 to about 0.0300. The top cap 52 has an opening 62 through it.

FIG. 7A shows the bottom cap 54 of the elongated housing 8 with line E-E bisecting the bottom cap 54 of the elongated housing 8 (See also FIG. 7H). The bottom cap 54 has a top end 64 and a bottom end 68. Just above the bottom end 68 of the bottom cap 54 is a mesh screen 66. The bottom cap 54 has an opening 70 through it (See also FIG. 7A).

The cartridge 75, filled with charcoal is inserted into the elongated housing 8 which is inserted into the flexible plug 14. The flexible plug 14 has top end 16 and a bottom end 18. This flexible plug 14 has an outside surface 20 and an inside surface 22. The flexible plug 14 also has a top opening 26 and a bottom opening 24. The flexible plug 14 also has a top surface 28. In one embodiment, the outside surface 20 can contain protruding lips 77 spaced around it which may compliment insertion and removal, as well as a snug fit of the flexible plug 14 (see FIG. 8).

The spout 30 has a top end 32 and a bottom end 34. The spout 30 has an angle and an opening therethrough. The top cap attaches the spout 30 to the top of the housing.

The top end cap 52 has a mesh 58 and the bottom end cap 54 also has a mesh 66 that are held in place by lips 74. The cartridge 75 is filled with charcoal 72 that acts as a filter. It has been discovered that the charcoal filters unwanted tastes from the alcohol that is being poured through the pouring spout 2.

Also shown here is a vacuum release tube 40 which allows air to flow into the alcohol bottle as alcohol is poured out. The spout 30 is angled in one direction while the vacuum release tube 40 angles in the other direction preventing the flow of the alcohol through the vacuum release system.

FIGS. 7B to 7H show top views of the various components of pouring spout 76, namely, FIG. 7B shows the top cap 52 and the spout 8; FIG. 7C shows the top mesh 58; FIG. 7D shows the flexible plug 14; FIG. 7E the elongated housing 8; FIG. 7F the filter cartridge 75; FIG. 7G, shows the bottom cap 54, and FIG. 7H, the bottom screen 66. FIG. 7I shows the cross sectional through line D-D and FIG. 7J shows the cross-sectional through line E-E.

Figure 9A:
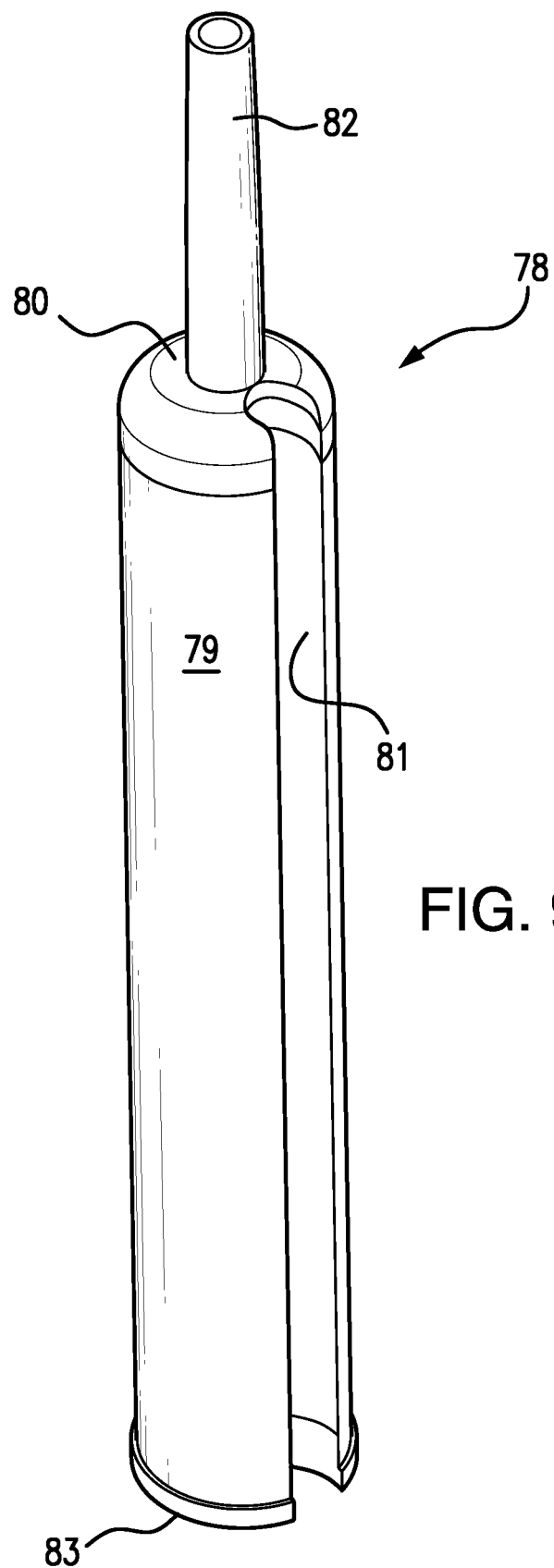
FIG. 9A is another embodiment of the pouring spout of this invention.

In yet another embodiment, and with reference to FIG. 9A, there is shown another device 78 of this invention. There is shown an elongated housing 79, a top cap 80, a first concave channel 81, a bottom cap 83, and a spout 82.

Figure 9C:
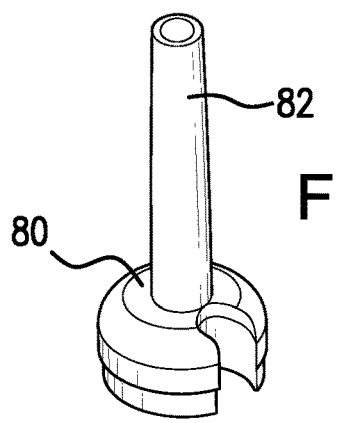
FIG. 9C is a full view of the top cap of this invention with spout.
Figure 9B:
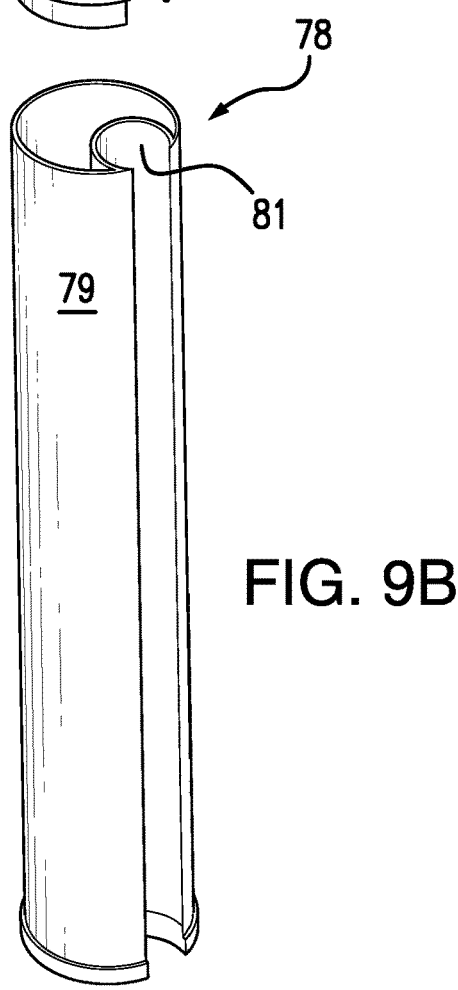
FIG. 9B is a full view of the elongated hollow hollow of this invention.
Figure 9F:
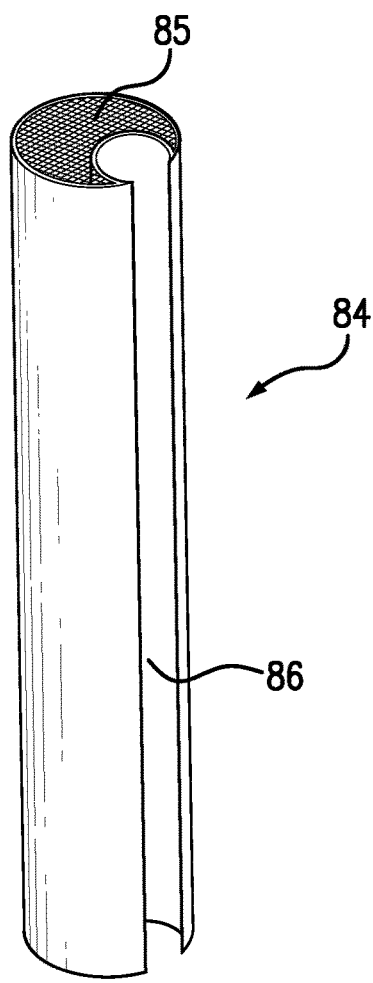
FIG. 9F is a full view of the filter cartridge of this invention.
Figure 9E:
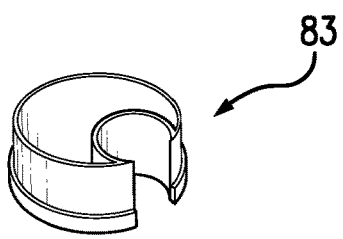
FIG. 9E is a full view of the bottom cap of this invention.

FIGS. 9B, 9C, and 9E show an exploded view of the device of FIG. 9A, where like numbers indicate like components and FIG. 9F is a full view of the filter cartridge 84 showing the mesh screen 85 and the second concave channel 86 The second channel 86 is configured to fit and align with first concave channel 81.

FIG. 9G is a full view of the device of FIG. 9A showing the use of a gasket-plug 87 and a vacuum release tube 88. Note that the vacuum release tube 88 extends beyond the bottom 89 of the elongated hollow housing 79.

What is claimed is:

1. A filtration pouring spout for bottled liquids, said pouring spout comprising:
A. an elongated hollow housing, said elongated hollow housing having a top end and a bottom end, each said end being open;
B. said elongated hollow housing having an open removable top end cap on said top end thereof, said top end cap having contained therein a mesh screen, there being retainer lips mounted on an interior surface of said top end cap, said top end including a vacuum release opening extending therethrough, an open removable bottom end cap on said bottom end thereof, said removable bottom end cap having contained therein a mesh screen, there being retainer lips mounted on an interior surface of said removable bottom end cap, said bottom end cap including a vacuum release opening extending therethrough;
C. a flexible plug having a top surface and a top opening extending through the top surface and a bottom opening in a bottom thereof, said elongated hollow housing extending through said top opening and said bottom opening of the flexible plug such that said top end extends above said top surface of the flexible plug;
D. a spout having a base mounted to a top end of said open removable top end cap, said spout having a top end, said top end of said spout being bent a predetermined angle from vertical;
E. a vacuum release tube, said vacuum release tube mounted in said vacuum release opening of said top end cap such that a predetermined length of said vacuum release tube extends above a top end of said top end cap and is bent a predetermined angle from vertical, and extends in a horizontal direction 180 degrees from a horizontal direction of said bend in said spout;
F. said vacuum release tube extending on an inside surface of said elongated hollow housing from the vacuum release opening in said top end cap to the vacuum release opening in said bottom end cap;
G. a filter media filled cartridge fitted to the inside of said elongated hollow housing, said filter media filled cartridge having an upper end received by said top end cap and a lower end received by said bottom end cap.

* * * * *